No. 763,095. PATENTED JUNE 21, 1904.
J. G. EBKEN.
VEHICLE BRAKE.
APPLICATION FILED JUNE 24, 1903.
NO MODEL.
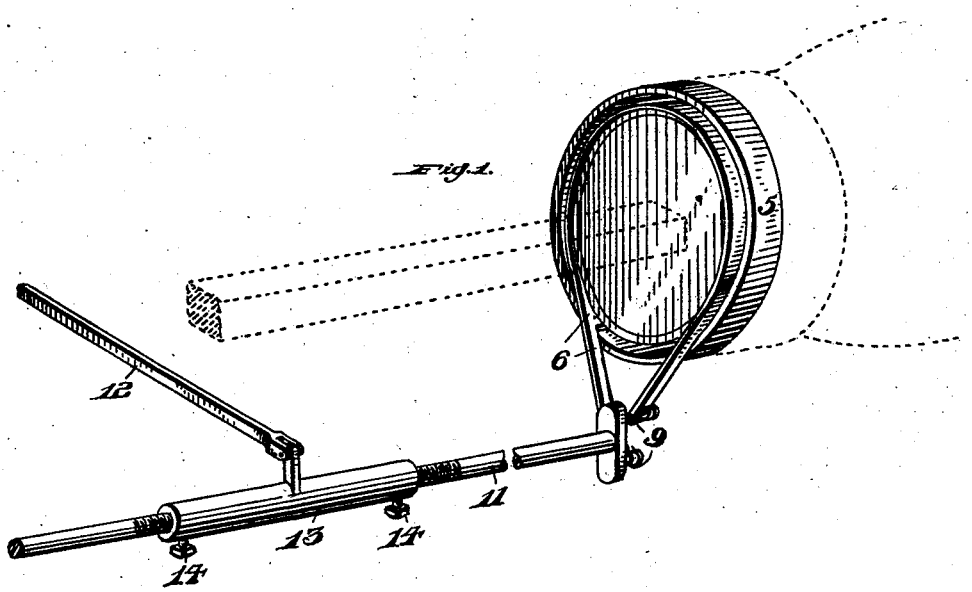
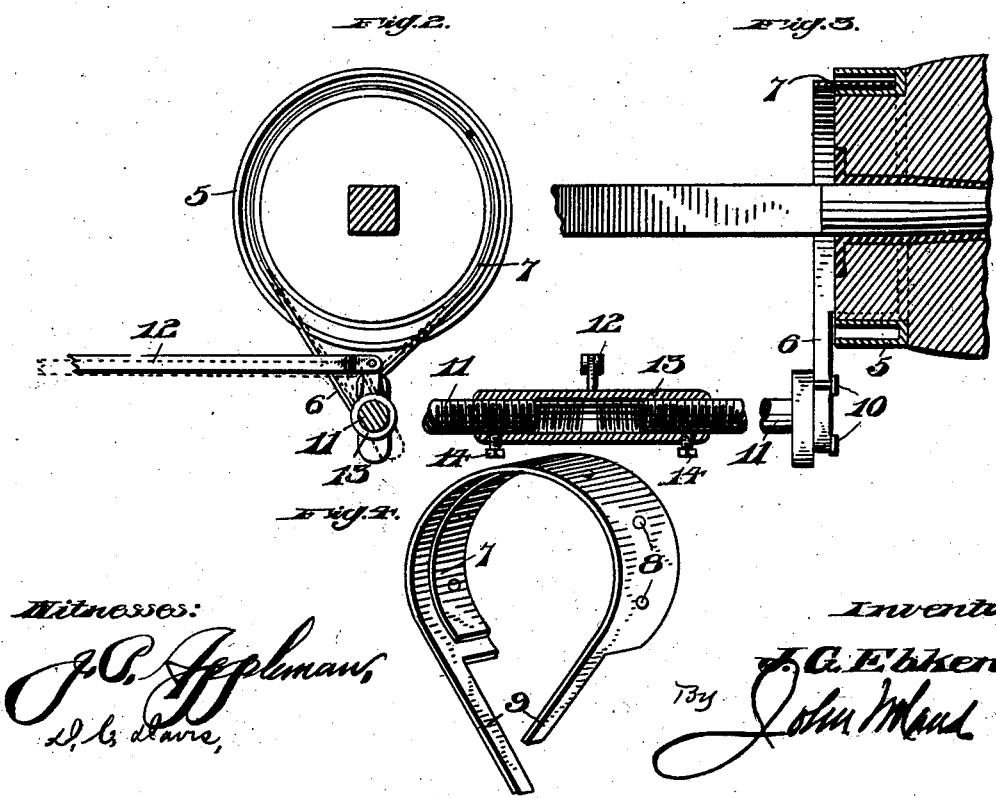

No. 763,095. Patented June 21, 1904.

UNITED STATES PATENT OFFICE.

JOHN G. EBKEN, OF PITTSBURG, PENNSYLVANIA.

VEHICLE-BRAKE.

SPECIFICATION forming part of Letters Patent No. 763,095, dated June 21, 1904.

Application filed June 24, 1903. Serial No. 162,894. (No model.)

*To all whom it may concern:*

Be it known that I, JOHN G. EBKEN, a citizen of the United States of America, residing at Pittsburg, in the county of Allegheny and State of Pennsylvania, have invented certain new and useful Improvements in Vehicle-Brakes, of which the following is a specification.

My invention relates to an improvement in frictional band-brakes for carriages, wagons, bicycles, and the like; and its consists in having certain novel features shown in the drawings and described in the specification and particularly pointed out in the claims. In this class of brakes that are used on automobiles and carriages when pressure is applied friction is not evenly distributed around hub of vehicle, as the usual construction is to have one end of brake-strap in a fixed position, whereas in my form of brake when pressure is applied to brake-rod it draws the ends of brake-strap together and the entire periphery of brake-band is in frictional engagement with ring, thereby causing an equal wearing upon band and the strain is equally distributed.

In the accompanying drawings, illustrating my invention, Figure 1 is a perspective view of my brake, showing it applied to hub of vehicle. Fig. 2 is an end view of the same. Fig. 3 is a section taken centrally of the hub with parts in elevation. Fig. 4 is a perspective view of frictional band.

Referring to the drawings and in order to carry my idea into practice, I employ a grooved ring 5. This is forced upon hub of wheel, and placed into groove of same is a frictional band 6. This is lined with a material 7 that produces a positive contact with the metal ring when pressure is applied. For such purpose oiled wood gives the best results, as it does not become heated so readily as metal. This is secured to band by rivets 8. The lower ends of straps 9 are bent around lugs 10 on end of rocker-bar 11 and when this is partly revolved by the movement of brake-rod 12 will assume the position as shown in dotted lines of Fig. 2. The bars 11, that enter sleeve 13, are provided with a right and left thread. By this arrangement can adjust to any width of vehicle, and to prevent it from working loose after once adapting to proper width employ binding-bolts 14.

I do not care to limit myself to the exact details of construction, as various changes may be made without departing from the spirit of my invention.

What I claim, and desire to secure by Letters Patent, is—

1. In a vehicle-brake, a hub, a hub-band with an annular recess extending inwardly from its outer edge, a brake-band comprising a strip of metal increased in width from a point near one end to a point near the opposite one, the wider portion of the brake-band extending into the recess and being of such rigidity as to bear on the hub-band when the ends of the strip are drawn, a rock-bar to which the ends of the brake-band are connected, and means for rocking the bar.

2. In a vehicle-brake, a hub, a hub-band with an annular recess extending inwardly from its outer edge, a brake-band comprising a strip of metal increased in width from a point near one end to a point near the opposite end, the wider portion of the brake-band extending into the recess and being of such rigidity as to bear on the hub-band when the ends of the strip are drawn, a rock-bar to which the ends of the brake-band are connected, a turnbuckle to which the rock-bar is secured, the said turnbuckle having a lever connection, substantially as described.

In testimony whereof I affix my signature, in the presence of two witnesses, this 18th day of June, 1903.

JOHN G. EBKEN.

Witnesses:
JOHN NOLAND,
J. P. APPLEMAN.